(12) United States Patent
Bhanjois et al.

(10) Patent No.: US 11,762,738 B2
(45) Date of Patent: Sep. 19, 2023

(54) REDUCING BANDWIDTH DURING SYNTHETIC RESTORES FROM A DEDUPLICATION FILE SYSTEM

(71) Applicant: EMC IP Holding Company LLC, Hopkinton, MA (US)

(72) Inventors: Bhimsen Bhanjois, Freemont, CA (US); Kedar Godbole, Pune (IN); Donna Barry Lewis, Holly Springs, CA (US); Nitin Madan, Cupertino, CA (US); Srikant Viswanathan, Pune (IN)

(73) Assignee: Dell Products L.P., Hopkinton, MA (US)

( * ) Notice: Subject to any disclaimer, the term of this patent is extended or adjusted under 35 U.S.C. 154(b) by 75 days.

(21) Appl. No.: 17/376,964

(22) Filed: Jul. 15, 2021

(65) Prior Publication Data
US 2022/0382642 A1    Dec. 1, 2022

(30) Foreign Application Priority Data

May 27, 2021  (IN) ............................. 202111023732

(51) Int. Cl.
*G06F 16/00*  (2019.01)
*G06F 11/14*  (2006.01)
*G06F 16/174*  (2019.01)

(52) U.S. Cl.
CPC ...... *G06F 11/1453* (2013.01); *G06F 16/1748* (2019.01); *G06F 2201/84* (2013.01)

(58) Field of Classification Search
CPC ............. G06F 11/1453; G06F 16/1748; G06F 2201/84
See application file for complete search history.

(56) References Cited

U.S. PATENT DOCUMENTS

2009/0249005 A1* 10/2009 Bender ............... G06F 11/1458
711/E12.001

\* cited by examiner

*Primary Examiner* — Tyler J Torgrimson
(74) *Attorney, Agent, or Firm* — Staniford Tomita LLP

(57) ABSTRACT

A request is received to restore a file at a deduplicated storage system to a client. The file resides at the storage system as a synthetic file based on a base file at the storage system. The request includes an indication that the base file is also present at the client. Metadata generated during a backup of the file to the storage system is reviewed. The metadata includes references to data determined to be in the base file at the storage system, and references to other data determined to not be in the base file at the storage system. The other data determined to not be in the base file is read from the storage system and transmitted to the client. Upon receipt, the client assembles the requested file using the base file present at the client and the other data determined to not be in the base file.

18 Claims, 10 Drawing Sheets

REDUCING BANDWIDTH DURING SYNTHETIC RESTORES FROM A DEDUPLICATION FILE SYSTEM

CROSS-REFERENCE TO RELATED APPLICATIONS

This application claims priority to India Provisional Patent Application No.: 202111023666, filed May 27, 2021, which is incorporated by reference for all purposes.

TECHNICAL FIELD

The present invention relates generally to information processing systems, and more particularly to restoring files of a file system.

BACKGROUND

Conducting backups to a backup storage system is a key activity for many organizations. Having backups allows an organization to restore files from the storage system in the event of accidental deletion, data corruption, or other data loss event. The amount of data generated by an organization can be immense. One way to manage the amount of data on the storage system is with a deduplication file system. A storage system with a deduplication file system may be made available as part of a backup or data protection system for a set of clients in the organization. When, for example, files are to be backed up to a deduplication file system, the file system determines whether or not file data already exists in the file system. File data that is unique, e.g., does not already exist, is stored. File data that is not unique, e.g., is redundant, is not stored. Instead, the file system generates metadata pointing to where the already stored data exists in the storage system.

Typically, when a file is to be restored, the entire file is read. Reading a file requires time and compute resources. The required time and compute resources is compounded when a deduplication file system is involved because pieces of file data may be scattered throughout the storage system as a result of the deduplication process. Network bandwidth is also consumed when transmitting a restored file to a requesting client. This can lead to lengthy restore times especially when large files are involved.

There is a need for improved systems and techniques for performing file restorations from a deduplication file system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
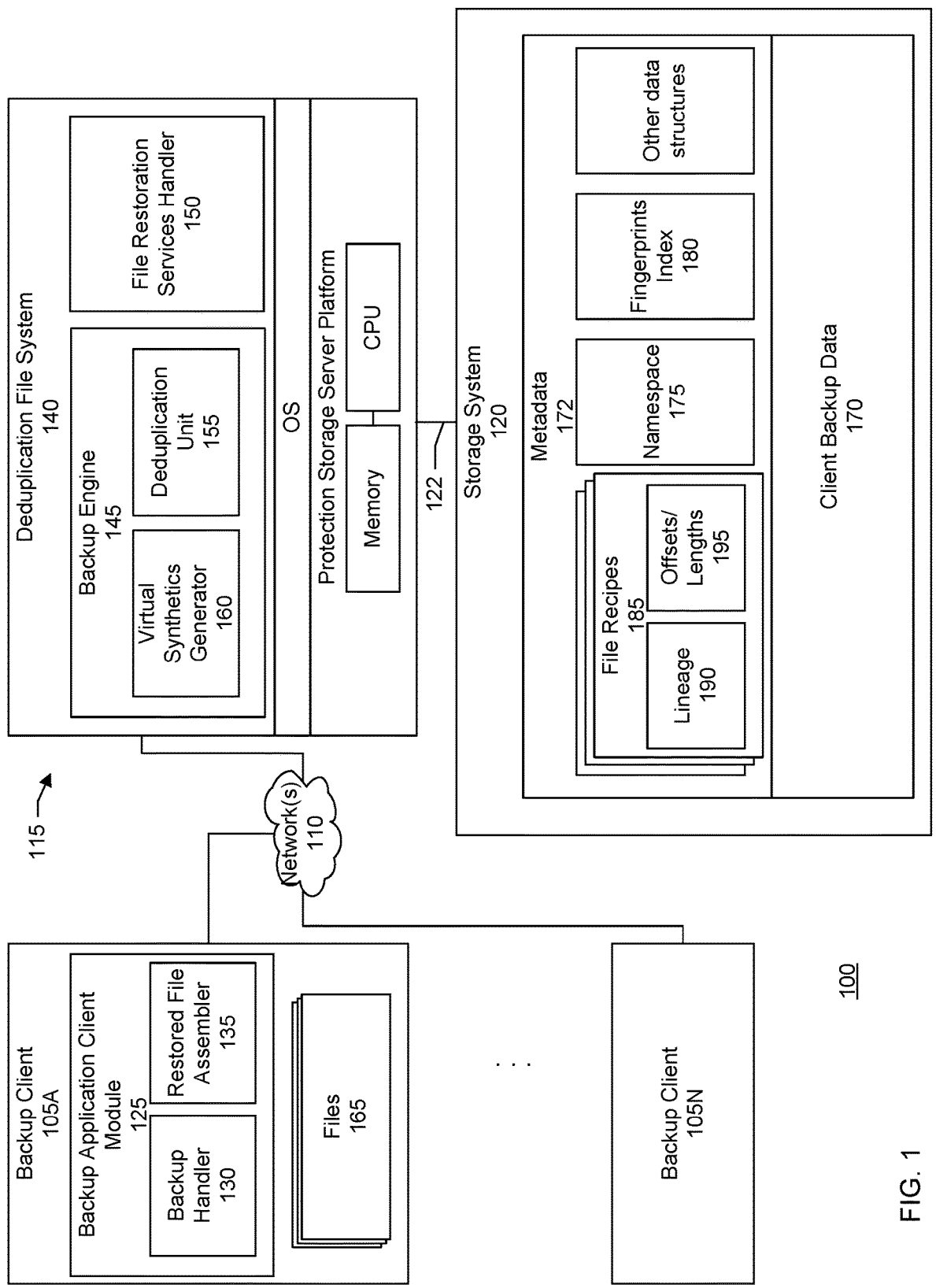
FIG. 1 shows a block diagram of an information processing system comprising a deduplication file system that can reduce bandwidth required for restorations, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a simplified block diagram of an information processing system 100 within which methods and systems for reducing bandwidth during synthetic restores from a deduplication file system may be implemented. The example shown in FIG. 1 includes a set of backup clients 105A-N connected via a network 110 to a data protection backup system 115, which in turn is connected to a backup storage system 120 via an interconnect 122. The interconnect may include a bus, a connection over a network such as a storage area network (SAN), or any other connection scheme to communicatively connect to the storage system.

Each client includes a backup application client module 125 having a backup handler 130 and a restored file assembler 135. The data protection backup system includes a deduplication file system 140 that may be hosted by a single server or distributed across a cluster of servers. The deduplication file system includes a backup engine 145 and a file restoration services handler 150. The backup engine includes a deduplication unit 155 and a virtual synthetics generator 160. It should be appreciated that the blocks shown in FIG. 1 and other figures may be functional and there can be many different hardware and software configurations to implement the functions described. For example, the backup handler and file assembler functionalities may be combined into a single code module, reside in separate code modules, one or more functionalities may be implemented as application program interface (API) libraries on the client and external to the backup application, and so forth.

In brief, the client backup handler coordinates with the backup engine to backup client data such as files 165 on the clients to the backup storage system. Backups may include an entire file system of a client, portions or subsets of files in the client file system, a database, or any other unit of data. The deduplication unit is responsible for deduplication of the backups. In particular, data regions, portions, or segments of a file that are unique or changed from previous backups are written or stored to the backup storage system. However, regions of a file that have already been stored to the backup storage system, e.g., are duplicates or not changed from previous backups, are not again stored. Instead, metadata references are generated to point to the already stored regions.

The virtual synthetics generator is responsible for generating or creating virtual synthetics of the files. A virtual synthetic file appears as a regular file to a user or application. However, the file is physically stored at the backup storage system in a form or representation that includes references to one or more previously stored files, which may be referred to as base files, and synthesis metadata. Such metadata may include identifications of one or more base files on which a virtual synthetic file is based, relationship information of the virtual synthetic file to the one or more base files, location information identifying relevant regions of the one or more base files and corresponding locations in the virtual synthetic file, and other metadata.

The file restoration services handler is responsible for handling requests to restore files as requested by the client. In an embodiment, systems and techniques allow for returning to a client at most regions of a requested file such that a complete version of the file is assembled or rebuilt at the client using other regions of the requested file that are currently present at the client. This allows, among other benefits, for reducing the amount of bandwidth consumed because the entire file does not have to be transmitted over the network. These systems and techniques recognize that backups often involve backups of different generations of the same file, file system, database, or other data object and that when there is a need to restore a particular generation to a client, an earlier generation may still be present on the client. Regions or portions of the earlier generation still presently residing at the client that are the same as the requested generation to restore can be used to help reduce the amount of data transmitted to the client.

More particularly, in an embodiment, there is a deduplication system that provides methods for optimizing bandwidth at the time of ingest or backup. An example of a backup protocol that may be associated with the deduplication system is Data Domain Boost (DDBoost) as provided by Dell EMC of Dell EMC of Hopkinton, Mass. and Round Rock, Tex. These techniques include client-side deduplication or synthetic backups and make a significant impact on both throughput and network utilization. Unlike backup, typically when a file is restored from a deduplication system, the entire file is read. The network capacity usage is equal to the size of the file being read or, in some cases, the size of the file compressed.

Restore performance is often further hindered by the deduplication process itself. As the deduplication ratio increases, not only will the disk accesses be scattered all over the volume, but also the number of disk accesses required to restore the same amount of data may increase due to read input/output (TO) amplification, also referred to as "bad locality."

In an embodiment, systems and techniques provide a novel way of applying backup deduplication techniques available on the deduplication system to the restore process for synthesized backup files, such that a full restore requires retrieving only data not already available on the client system.

In this embodiment, at the time a file is restored, knowledge gleaned at the time the file was ingested using virtual synthetics is used, along with knowledge of files and cached data resident on the client system, to identify only the unique regions to be retrieved. Reducing the read processing down to only these unique regions reduces both the bandwidth used to return the data along with the number of disk accesses required on the deduplication system. Advanced prefetching techniques may be used when retrieving this reduced data set to provide an additional performance improvement.

The clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage system may represent logical storage that includes any number of physical storage devices connected to form a logical storage.

The storage system stores client backups 170. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format. The storage system, in addition to backup storage of client files, also stores and maintains other data structures including metadata 172 to facilitate ingest, deduplication, organization, performance, and recovery of files that have been backed up to the storage system. In particular, there is a namespace 175, fingerprints index 180, and file recipes 185. The namespace provides an organizing structure for the files. The fingerprints index includes a listing of fingerprints corresponding to segments already stored and residing at the storage system.

The file recipes are associated with the virtual synthetic files and include lineage information 190 and offsets/lengths 195. The lineage information tracks, for a virtual synthetic file, one or more base files from which the virtual synthetic file was formed. Base files may be tracked using any attribute or combination of attributes associated with a base file and that identifies the base file. The offsets/lengths identify locations and location ranges to track specific regions within the one or more base files from which the virtual synthetic file was formed and corresponding locations within the virtual synthetic file at which those specific regions start. A location may be specified as a starting offset in file, and a corresponding range may be specified as a length starting from the offset (or as a starting offset and ending offset).

A file system provides a way to organize data stored in a storage system and present that data to clients and applications in a logical format. The file system supports network protocols for accessing remote centrally stored data. An example of such a protocol includes Network File System (NFS). NFS is a distributed file system protocol originally developed by Sun Microsystems in 1984. NFS is an open standard and allows a user on a client computer to access files over a computer network much like local storage is accessed. NFS allows the client computer to mount a remote file system as if it were a local file system. Thus, users—regardless of what workstation they may be using—can have access to their files in a centrally managed manner. Such file systems facilitate document and workspace sharing and data consistency as users on the network will be accessing the same set of files. Other examples of supported file system protocols allowing for remote access include Common Internet File System (CIFS), Server Message Block (SMB), Data Domain (DD) Boost, and others. A client may run any number of different types of protocols.

More particularly, the file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying file system objects through a file path. A file can be identified by its path through a structure of folders and subfolders in the file system. A file system may hold many hundreds of thousands or even many millions of files across many different folders and subfolders and spanning thousands of terabytes.

Figure 2:
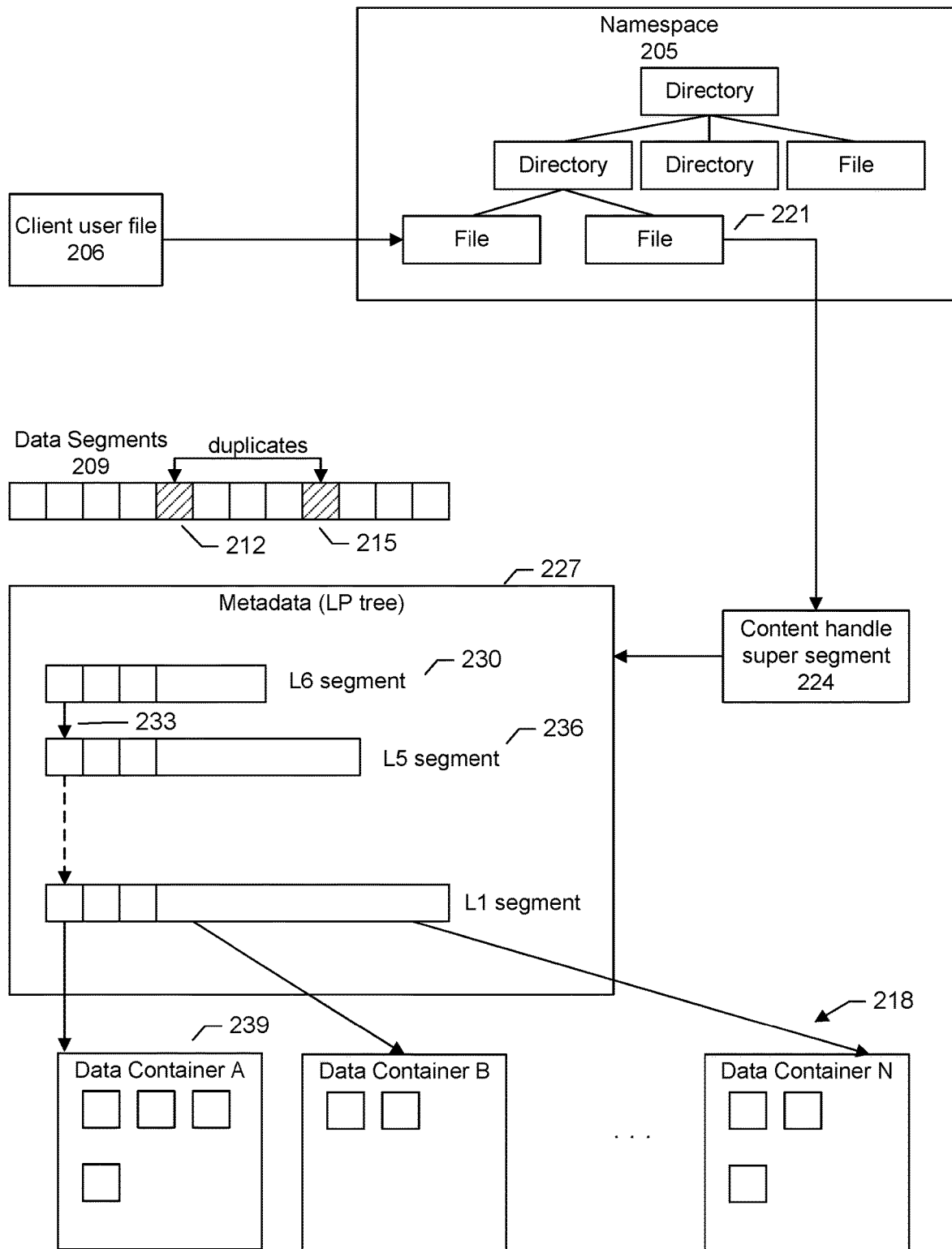
FIG. 2 shows an example of a deduplication process, according to one or more embodiments.

A deduplication file system is a type of file system that can reduce the amount of redundant data that is stored. FIG. 2 shows a block diagram illustrating a deduplication process of the file system according to one or more embodiments. As shown in the example of FIG. 2, the file system maintains a namespace 205. As data, such as incoming client user file 206, enters or is ingested by the file system, it is segmented into data segments 209 and filtered against existing segments to remove duplicates (e.g., duplicate segments 212, 215). A segment that happens to be the same as another segment that is already stored in the file system may not be again stored. This helps to eliminate redundant data and conserve storage space. Metadata, however, is generated and stored that allows the file system to reconstruct or reassemble the file using the already or previously stored segment. Metadata is different from user data. Metadata may be used to track in the file system the location of the user data within the storage system.

More specifically, the file system maintains among other metadata structures a fingerprint index. The fingerprint index includes a listing of fingerprints corresponding to data segments already stored to the storage system. A cryptographic hash function (e.g., Secure Hash Algorithm 1

(SHA1)) may be applied to segments of the incoming file to calculate the fingerprints (e.g., SHA1 hash values) for each of the data segments making up the incoming file. The fingerprints are compared to the fingerprint index. Matching fingerprints indicate that corresponding data segments are already stored. Non-matching fingerprints indicate that the corresponding data segments are unique and should be stored.

Unique data segments may be stored in fixed size immutable containers 218. There can be many millions of containers tracked by the file system. The fingerprint index is updated with the fingerprints corresponding to the newly stored data segments. A content handle 221 of the file is kept in the file system's namespace to support the directory hierarchy. The content handle points to a super segment 224 which holds a reference to a top of a segment tree 227 of the file. The super segment points to a top reference 230 that points 233 to metadata 236 and data segments 239.

In other words, in a specific embodiment, each file in the file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A segment tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In an embodiment, every segment in the file system is identified by a 24 byte key (or the fingerprint of the segment), including the LP segments. Each LP segment contains references to lower level LP segments. An example of a tree data structure includes a binary tree.

Figure 3:
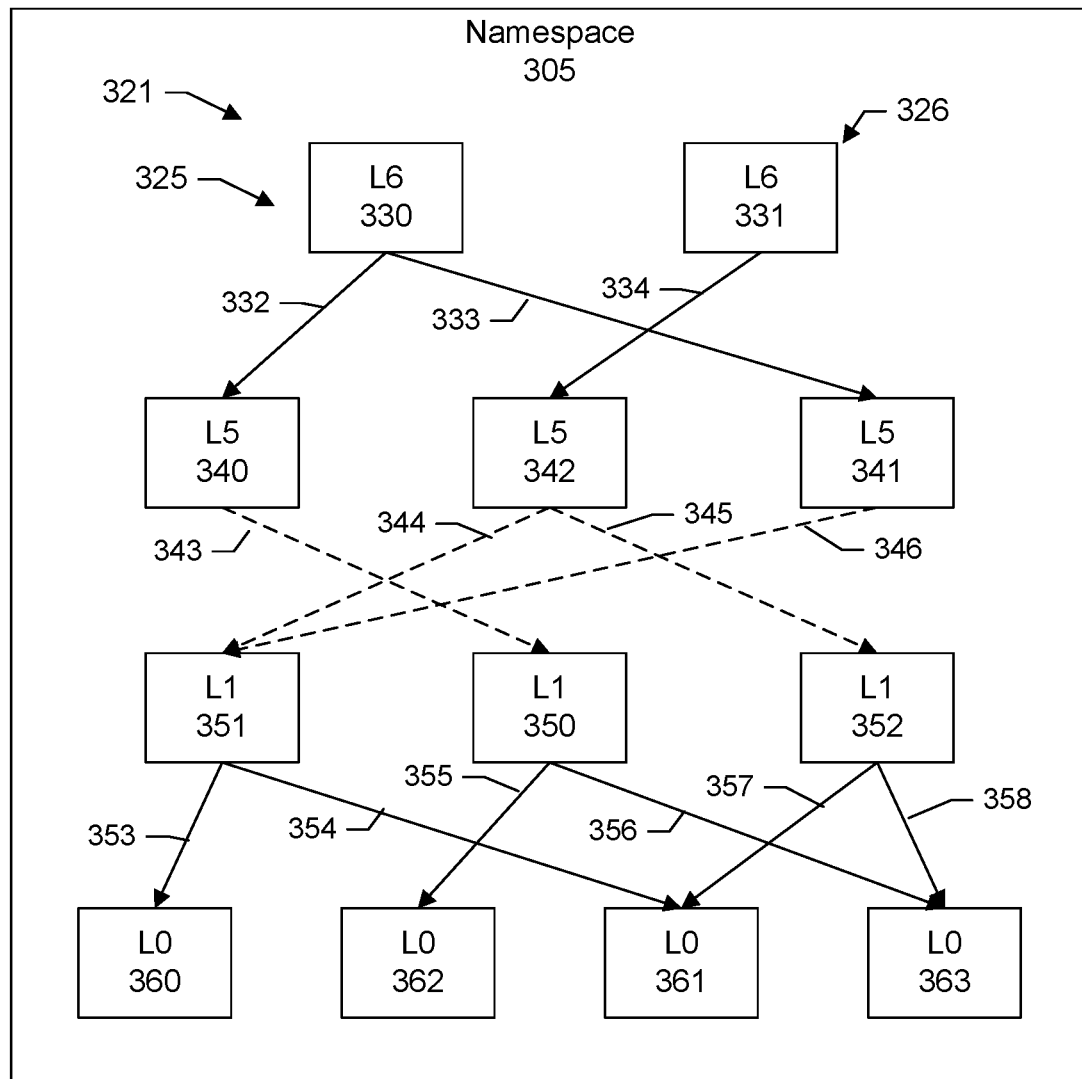
FIG. 3 shows an example of a namespace, according to one or more embodiments.

FIG. 3 shows further detail of a namespace 305 of the file system that may be used to organize the client data stored in the storage system. The namespace includes a set of segment trees 321 where each file in the file system is represented by a segment tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper level segments that store metadata (e.g., fingerprints) and may be referred to as LP segments. The lowest level segments are the L0 segments which represent actual data content of the file. An upper level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 3 shows segment levels L6, L5, L1, and L0. Segment levels L4, L3, and L2 have been omitted for purposes of clarity. An L6 segment forms a root or parent. Thus, in the example shown in FIG. 3, there is a first segment tree 325 having an L6 segment 330 and representing a first file. There is a second segment tree 326 having an L6 segment 331 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 3, L6 segment 330 references L5 segments 340, 341 as shown by arrows 332, 333 from L6 330 to L5 340, 341, respectively. L6 segment 331 references L5 segment 342 as shown by an arrow 334 from L6 331 to L5 342. L5 segment 340 references an L1 segment 350 as shown by an arrow 343 from L5 340 to L1 350. L5 segment 342 references L1 segments 351, 352 as shown by arrows 344, 345 from L5 342 to L1 351, 352, respectively. L5 segment 341 references L1 segment 351 as shown by an arrow 346 from L5 341 to L1 351. The arrows from the L5 to L1 segment level are shown in broken lines to indicate that there can be other intermediate levels between the L5 and L1 levels.

L1 segment 351 references L0 segments 360, 361 as shown by arrows 353, 354 from L1 351 to L0 360, 361, respectively. L1 segment 350 references L0 segments 362, 363 as shown by arrows 355, 356 from L1 350 to L0 362, 363, respectively. L1 segment 352 references L0 segments 361, 363 as shown by arrow 357, 358 from L1 352 to L0 361, 363, respectively.

In a specific embodiment, an upper level segment includes a fingerprint of fingerprints of one or more lower level segments referenced by the upper level segment. For example, L6 segment 330 includes a finger of fingerprints of L5 segments 340, 341. L6 segment 332 includes a fingerprint of fingerprint of L5 segment 342. L5 segment 340 includes a fingerprint of fingerprint of L1 segment 350. L5 segment 342 includes a fingerprint of fingerprints of L1 segments 351, 352, and so forth.

Figure 4:
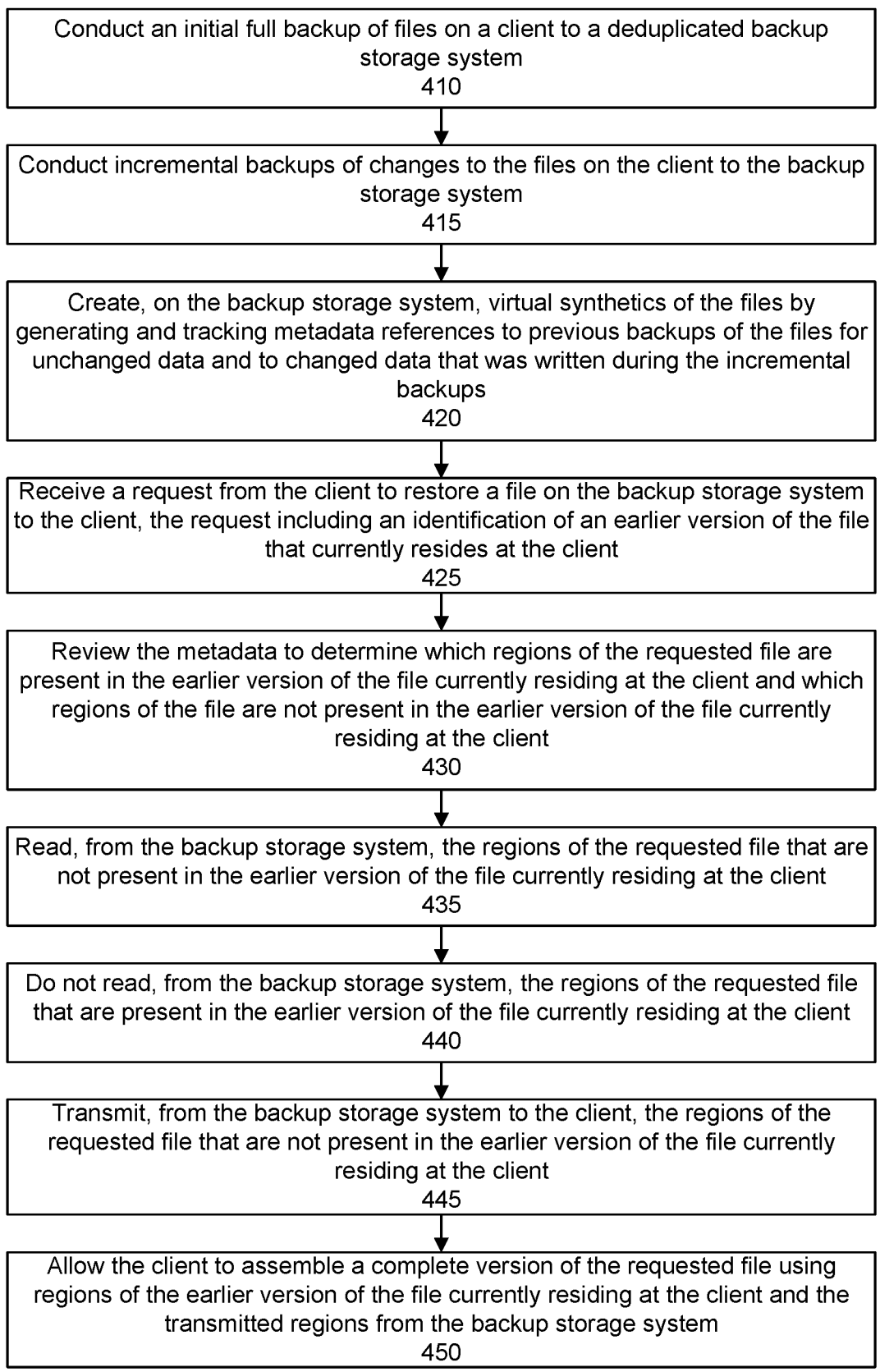
FIG. 4 shows an overall flow of the deduplication file system, according to one or more embodiments.

FIG. 4 shows an overall flow for reducing bandwidth during synthetic restore operations from a deduplication file system, according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 410, an initial full backup of files on a client to a deduplicated backup storage system is conducted.

In a step 415, incremental backups of changes to the files on the client are conducted. In a step 420, virtual synthetics of the files are created at the backup storage system by generating and tracking metadata references to previous backups of the files for unchanged data regions, segments, or chunks and to changed data regions, segments, or chunks written during an incremental backup. In other words, a virtual synthetic of a file may be created from a previous version of a file where unchanged regions with respect to the previous version are synthesized (e.g., references generated to refer to the unchanged regions) and where changed regions with respect to the previous version are written to storage.

In a step 425, a request is received from the client to restore a file on the backup storage system to the client. In an embodiment, the request includes an identification of an earlier version of the file that currently resides at the client.

In a step 430, the metadata is reviewed to determine which regions of the requested file are present in the earlier version of the file currently residing at the client and which regions of the file are not present in the earlier version of the file currently residing at the client.

In a step 435, the regions of the requested file that are not present in the earlier version of the file currently residing at the client are read from the backup storage system. However, regions of the requested file that are present in the earlier version of the file currently residing at the client are not read (step 440).

In a step 445, the regions of the requested file that are not present in the earlier version of the file currently residing at the client are transmitted from the backup storage system to the client (regions of the requested file present in the earlier version of the file currently residing at the client are not transmitted).

In a step 450, the client is allowed to assemble a complete version of the requested file using regions of the earlier version of the file currently residing at the client and the transmitted regions from the backup storage system.

As an example, consider that a full backup is written. The backup client changes since this backup was created. In a file system backup of the client, for example, the file system tracks the files that changed. When it is time to create the next backup, rather than write the entire filesystem backup, the changes being tracked are used to synthesize an "incremental full" image.

How these changes are used to create an incremental full backup can vary. In an embodiment, a method includes synthesizing the regions of the file that changed with the previous version. This may be referred to as virtual synthetics. Virtual synthetic operations are used to "stitch" data from the previous backup file or multiple previous backup files already on the deduplication system with the changes or deltas to create the full image. Applications may mix a series of requests to synthesize unchanged data from the original backup with writes from the client of delta data.

Figure 5:
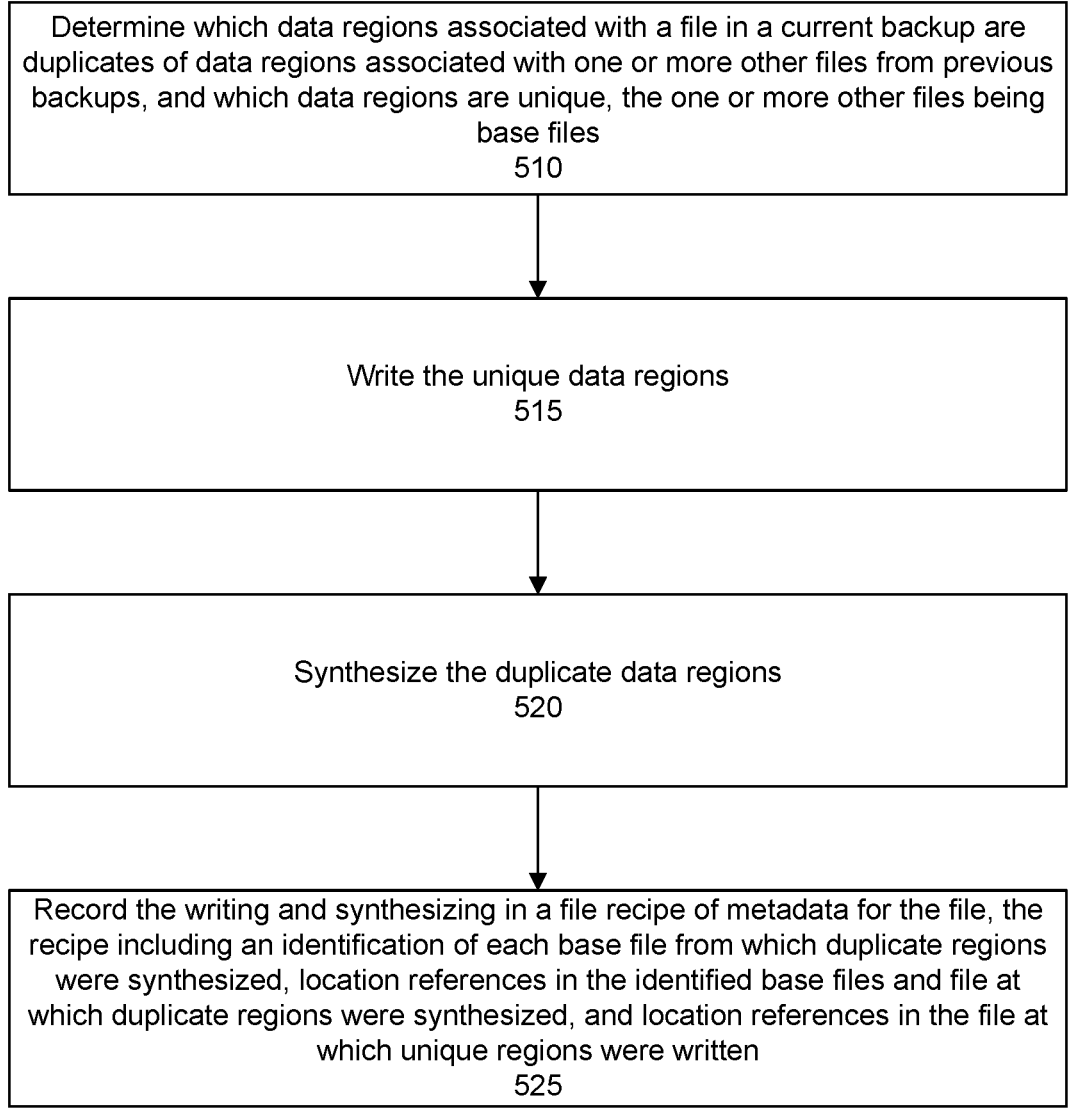
FIG. 5 shows an example of data ingest during a backup to the deduplication file system, according to one or more embodiments.

FIG. 5 shows a more detailed flow for virtual synthetic operations. In a step 510, a determination is made as to which regions associated with a file in a current backup are duplicates of regions associated with one or more other files from previous backups, and which regions are unique. The one or more other files may be referred to as being base files. In a step 515, the unique regions are written at the backup storage system. In a step 520, duplicate regions are synthesized at the backup storage system rather than being again written. In a step 525, the series of writing and synthesizing operations are recorded in a file recipe of metadata for the file. The recipe includes an identification of each base file from which duplicate regions were synthesized, location references in the identified base files and file at which duplicate regions were synthesized, and location references in the file at which unique regions were written. In an embodiment, a location may be specified as a range having a starting offset and length.

Figure 6:
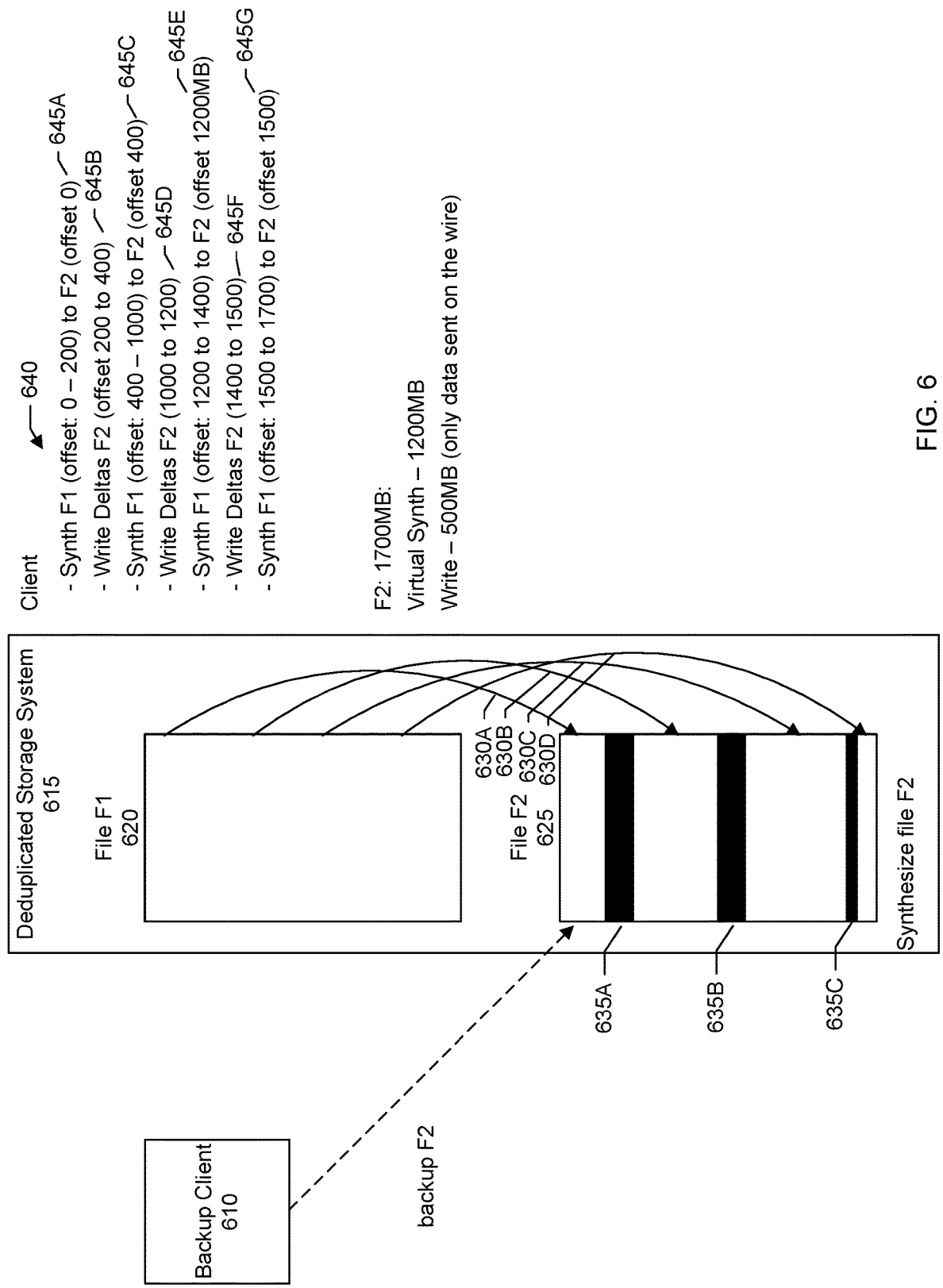
FIG. 6 shows an example of generating a virtual synthetic file during a backup, according to one or more embodiments.

FIG. 6 shows a further example of creating incremental full images. In this example, there is a backup client 610 and a deduplication storage system 615. First file F1 620 is backed up first from the client to the storage system. A subsequent backup of a second file F2 625 to the storage system includes synthesizing data from F1 and writing new data. In this example first file F1 is the base file. Arrows 630A-D pointing from base file F1 to the unfilled regions of file F2 are shown to graphically represent the synthesis operations from base file F1. Filled regions 635A-C of file F2 represent the write operations of the deltas or changes from base file F1.

Thus, the process to synthesize or create F2 from base file F1 involves a series 640 of synthesize and write operations. In particular, a first operation 645A includes a synthesis operation that identifies a first region by an offset and length within F1 (e.g., offset 0-200) and a location within F2 (e.g., offset 0) at which the first region is to start. As shown in the example of FIG. 6, the first operation includes synthesizing 200 MB.

A second operation 645B includes a write operation that identifies a second region by an offset and length within F2 (e.g., offset 200 to 400) at which deltas are written. The second operation thus includes writing 200 MB.

A third operation 645C includes a synthesis operation that identifies a third region by an offset and length within F1 (e.g., offset 400-1000) and a location within F2 (e.g., offset 400) at which the third region is to start. The third operation thus includes synthesizing 600 MB.

A fourth operation 645D includes a write operation that identifies a fourth region by an offset and length within F2 (e.g., offset 1000 to 1200) at which deltas are written. The fourth operation thus includes writing 200 MB.

A fifth operation 645E includes a synthesis operation that identifies a fifth region by an offset and length within F1 (e.g., offset 1200-1400) and a location within F2 (e.g., offset 1200) at which the fifth region is to start. The fifth operation thus includes synthesizing 200 MB.

A sixth operation 645F includes a write operation that identifies a sixth region by an offset and length within F2 (e.g., offset 1400 to 1500) at which deltas are written. The sixth operation thus includes writing 100 MB.

A seventh operation 645G includes a synthesis operation that identifies a seventh region by an offset and length within F1 (e.g., offset 1500-1700) and a location within F2 (e.g., offset 1500) at which the seventh region is to start. The seventh operation thus includes synthesizing 200 MB.

A resulting size of F2 is 1700 MB (e.g., 200+200+600+200+200+100+200=1700). However, 1200 MB were synthesized (e.g., 200+600+200+200=1200); and only 500 MB was written (e.g., 200+200+100=500). File F2 may be referred to as an incremental full.

As shown in the example of FIG. 6, when incremental files are being written the change rate is often low (e.g., 500 MB of changes or deltas versus 1200 MB synthesized). The use of virtual synthetics can allow most of the data to be synthesized from the previous base file. An advantage to this approach is the synthesis operation does not duplicate the data. It simply associates references to it. The operation itself is very lightweight. Another technique is to write the delta regions to a single file and then to send a mix of requests to synthesize data from both the original backup and this delta file, to create the full image.

Virtual synthetics can be used when there are shifts in the data. For example, when backing up a filesystem, the contents of the backup file is itself made up of files. From one backup to the next files contained within it may grow, shrink, or be deleted. When virtual synthetics is used there is no requirement that the changed or unchanged regions remain at the same offset from one backup to the next.

In an embodiment, metadata is recorded when creating an incremental full. In particular, sets of metadata are captured when a synthetic full image is being created. These sets of metadata include lineage (identifying the files used to create the incremental full image) and offset ranges that are being synthesized from the base files. This lineage and base file metadata collected on ingest, along with information provided by the client, is used to enable similar bandwidth optimizations at the time of restore.

In an embodiment, there is a method for achieving bandwidth optimized restore consistent with the ingest method. Metadata stored at the time of ingest is used to help discern whether the backup file was created through virtual synthetics and the corresponding change information tracked at the time of ingest can be used to identify what to restore.

The technique includes an element of client-side knowledge. When issuing the restore request the location of existing backup files still resident on the client to be used for deduplication is provided. As part of the processing, steps are taken to ensure the base file(s) identified on the client matches that on the server. For example, in an embodiment, checksums, lengths, other indicia, or combinations of these may be used to verify and confirm that a base file identified on the client is identical to a corresponding base file on the backup storage system.

A method may include transmitting in conjunction with a request to restore a file to a client, a checksum of a base file present at the client and from which the file to restore is based; comparing a checksum of a corresponding base file residing at backup storage with the checksum of the base file present at the client to determine whether the base file present at the client is identical to the base file residing at backup storage. A comparison of checksums may be performed at the client or backup server. A verification that the base files are identical may be performed before any portions or regions of a file to restore are transmitted from the backup storage system to the client.

In this embodiment, as a file is being created with virtual synthetics the base file information and offset/length regions can be tracked and stored in the file's metadata on the deduplication system. This information makes up the "recipe" of the file. When restoring files generated using virtual synthetics, the recipe information is used to identify what data to return. The client indicates as part of the restore what base files are available on the client. Only data not associated with the base files identified will be retrieved, along with information about the local base file/offset that makes up the remainder of the restore request.

Figure 7:
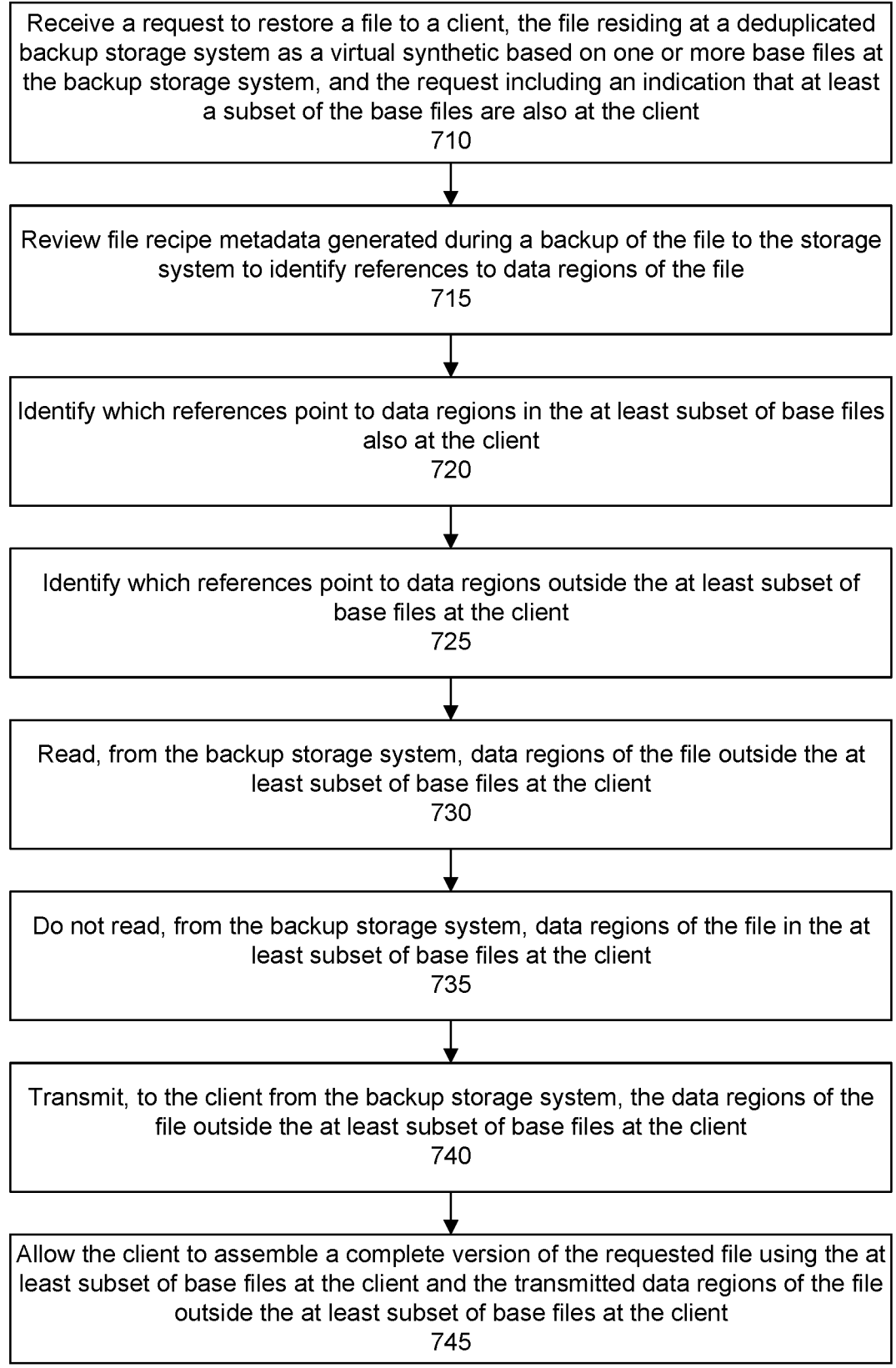
FIG. 7 shows a flow for restoring from the deduplication file system, according to one or more embodiments.

FIG. 7 shows a more detailed flow for handling a restore request. In a step 710, a request is received to restore a file to a client, the file residing at a deduplicated backup storage system as a virtual synthetic based on one or more base files at the backup storage system, and the request including an indication that at least a subset of the base files are also at the client. The indication may include, for example, identifiers such as checksums or other attributes associated with the base files. In an embodiment, the client backup application tracks and stores metadata information about backups performed on the client to the deduplicated storage system. The metadata may be stored at the client and includes file lineage information identifying a file and associated file versions or generations that were backed up over the course of various backups. When a user of the backup application selects a particular version of the file to restore from the storage system and issues a restore command, the backup application can examine the client metadata, including file lineage, and indicate to the storage system server which file versions or generations are still present on the client. The indication of what files are still present on the client can thus be transparent to the user of the backup application.

In a step 715, file recipe metadata generated during a backup of the file to the storage system is reviewed to identify references to data regions of the file. The file recipes can be maintained by the deduplication storage server. In a step 720, an identification is made as to which references point to data regions in the at least subset of base files also currently present at the client. In a step 725, an identification is made as to which references point to data regions outside the at least subset of base files at the client. These identifications or determinations from the file recipe of what data is in a base file present at the client and what data is not are made at the server. This helps to reduce the amount of logic needed at the client or application and reduces the amount metadata needed to be maintained by the client or application. For example, the client or application may track relationships across different file versions or generations to facilitate indicating to the server the relevant base files that may be present at the client, but does not need to track differences across the different file versions or generations. File recipe metadata further allows the storage server to identify what data is to be read and pre-fetch data into a cache based on an upcoming read. This helps to speed the read process.

In a step 730, a read is performed on the backup storage system of data regions of the file outside the at least subset of base files at the client. A read from the backup storage system is not performed for data regions of the file that happen to also be in the at least subset of base files at the client.

In a step 740, the data regions of the file outside the at least subset of base files at the client is transmitted from the backup storage system to the client.

In a step 745, the client is allowed to assemble a complete version of the requested file using the at least subset of base files at the client and the transmitted data regions of the file outside the at least subset of base files. For example, the client may read the base file still presently residing at the client (see, e.g., file F1, FIG. 8), write any unchanged data and the new data received from the storage server to a temporary file which when the writes are completed is renamed with the file to restore (see, e.g., file F2, FIG. 8). Alternatively, the API used to read F2 providing F1 as the base file reference, can return the data to the caller. Using the response from the storage server, the API logic could either return data from the storage server or read and return data from F1 (already on the system). This prevents the client application from needing to piece these together.

In an embodiment, there is a method including receiving a request to restore a later version of a file at a deduplicated storage system to a client, the request comprising an indication that the client has an earlier version of the file, and both the later and earlier versions having been backed up to the deduplicated storage system; reviewing a file recipe associated with the later version of the file and generated during a backup of the later version of the file to the deduplicated storage system, the file recipe comprising a first listing of offsets and lengths from the earlier version, and a second listing of offsets and lengths from the later version, the first listing of offsets and lengths corresponding to regions from the earlier version that were duplicates of regions in the later version, and the second listing of offsets and lengths corresponding to regions that were written during a backup of the later version of the file, the written regions thereby not being duplicates of regions in the earlier version; reading, from the deduplicated storage system, first data referenced by the second listing of offsets and lengths; not reading, from the deduplicated storage system, second data referenced by the first listing of offsets and lengths; returning the first data to the client; and not returning the second data to the client.

Figure 8:
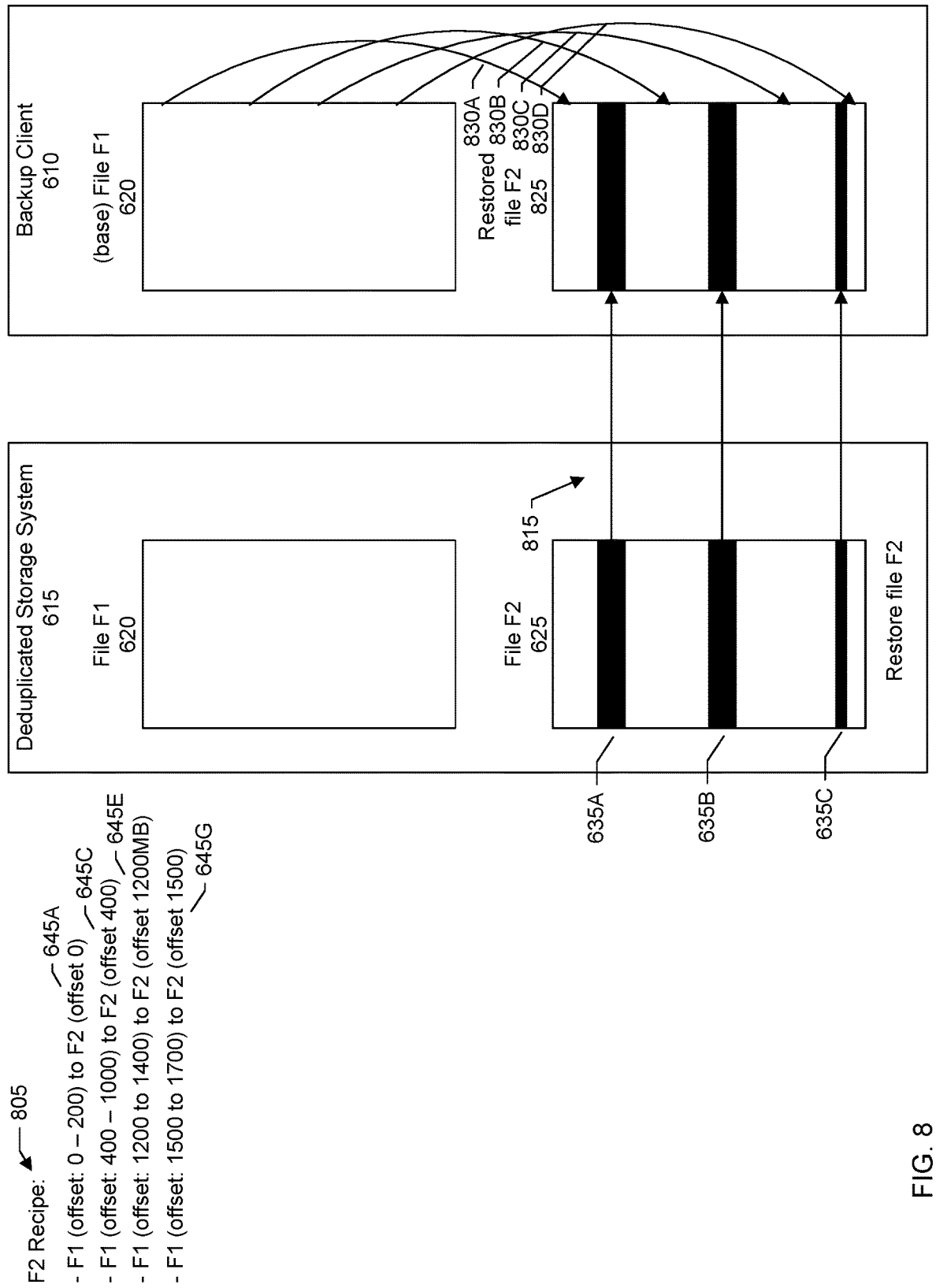
FIG. 8 shows an example of an efficient restore process, according to one or more embodiments.

FIG. 8 shows a further example of handling a restore request using the same virtual synthetics example shown in FIG. 6. A recipe 805 for second file F2 identifies the pieces of the file that were created from the previous file, e.g., first file F1. In particular, the recipe identifies the offset/length values corresponding to the pieces from first file F1. To restore file F2, if file F1 620 is still available on the client, the recipe information can be used to return 815 only the three regions 635A-C unique to file F2 rather than the full file. Restored file F2 825 at the client can be assembled or stitched 830A-D using unchanged regions from (base) file F1 620 still presently residing at the client and changed regions 635A-C received from the deduplicated storage system.

Unlike alternatives to retrieve differences between files and restore only these, this technique does not require the step to retrieve the differences and supports shifts in the data. For example, a diffing process may be run on files that are block aligned having the same size to compare block by block and retrieve differences to restore. However, running the diffing process during a restore requires compute resources. Further, such an approach does not support file system backups where the file system may grow or shrink as files are added or deleted between backups, thereby introducing byte shifts in the data.

In an embodiment, the file recipe of a file, e.g., file F2, is generated as part of a backup of file F2 and before there is a request to restore file F2. The file recipe is already existing or present at the time a request to restore the file is received. Thus, there is no need to have a separate diffing process. As discussed, the file recipe includes metadata identifying data regions in a file, e.g., file F2 (e.g., offset and length) that had to be written to the backup storage system during a backup because these regions had changed from a base file, e.g., file F1, that was backed up in a previous backup. During a restore of file F2, the file recipe can be reviewed to determine which regions of file F2 need to be read from backup storage and returned to the client. Regions of file F2 that refer to base file F1 that are also present on the client do not have to be read and returned to the client. Not having to read and return the entire file reduces the amount of bandwidth needed to perform a restore and number of disk accesses to backup storage.

This approach can be applied when restoring any file previously created using virtual synthetics, when a base file is still present on the client system. As an example, consider a file system rollback. Virtual synthetics is commonly used when backing up file systems as data within the filesystem backup continues to shift. Files within the filesystem backup will grow or be removed, both introducing shifts in the data. Restoring an older version of the filesystem by reading back a point in time copy stored on the appliance can be extremely time-consuming and resource-intensive. The synthetic restore method enables the application to retrieve back only the data not still present on the client, and to synthesize the previous filesystem image on the client.

There are application specific methods that can be used to retrieve only differences between files created using synthetics. For example, if the file was created using virtual synthetics but there is no shifting of data beyond a block boundary the files can be compared and the blocks that are different can be retrieved. As another example, the contents of the backup file can be tracked from one backup instance to the next. Knowledge of the contents of the backup files, and the regions within that are different, can be used to retrieve only the differences.

The first approach, however, is dependent on an efficient method of retrieving differences between the two files, and the data within the file not shifting beyond a block boundary. The second is dependent on knowledge of the contents of the backup file, along with tracking the location of the data within the backup file. When the backup file is a filesystem, for example, the application needs a method of comparing the individual files within the filesystem backup that changed (e.g., snapdiff), and where these individual files exist within the backup file in order to retrieve only differences.

In an embodiment, systems and techniques are provided that can be applied to any file created using virtual synthetics, as long as the existence of base files still resident on the client can be provided. There is no dependency on the contents of the backup file itself or a need to track the location of data within the backup file. The tracking information already resident on the appliance can be used.

In an embodiment, there is a method for bandwidth optimized restores from a deduplication file system. In another embodiment, there is a method to use synthetic recipe tracking to identify differences to be returned on restore, to resynthesize the file on the client. In another embodiment, there is a method of retrieving differences for the purposes of restore when there are shifts in the data from one backup to the next.

In an embodiment, there is a method comprising: receiving a request to restore a file at a deduplicated storage system to a client, wherein the file resides at the deduplicated storage system as a synthetic file based on a base file at the deduplicated storage system, and the request comprises an indication that the base file is also present at the client; reviewing metadata generated during a backup of the file to the deduplicated storage system, the metadata comprising references to data that was determined to be in the base file at the deduplicated storage system, and references to other data that was determined to not be in the base file at the deduplicated storage system; reading, from the deduplicated storage system, the other data that was determined to not be in the base file; and transmitting, to the client, the other data that was determined to not be in the base file, wherein the client upon receipt assembles the file using the base file present at the client and the other data that was determined to not be in the base file. The method may include in response to the request to restore the file, not reading from the deduplicated storage system the data that was determined to be in the base file.

In an embodiment, the method further includes: during a backup of the file to the deduplicated storage system, deduplicating the file against at least the base file, the deduplicating comprising: identifying unique and duplicate regions of the file; writing the unique regions to the deduplicated storage system; and synthesizing the duplicate regions by tracking offsets and lengths in the base file corresponding to the duplicate regions, and offsets in the file at which the duplicate regions start. In an embodiment, the metadata is generated before the receiving the request to restore the file.

The method may include: comparing a checksum of the base file present at the client with a checksum of the base file at the deduplicated storage system to verify that the base files are identical.

In an embodiment, the metadata comprises a file recipe for the synthetic file, the file recipe comprising lineage information identifying the base file from which the synthetic file was formed, and offset ranges synthesized from the base file to form the synthetic file.

In another embodiment, there is a system comprising: a processor; and memory configured to store one or more sequences of instructions which, when executed by the processor, cause the processor to carry out the steps of: receiving a request to restore a file at a deduplicated storage system to a client, wherein the file resides at the deduplicated storage system as a synthetic file based on a base file at the deduplicated storage system, and the request comprises an indication that the base file is also present at the client; reviewing metadata generated during a backup of the file to the deduplicated storage system, the metadata comprising references to data that was determined to be in the base file at the deduplicated storage system, and references to other data that was determined to not be in the base file at the deduplicated storage system; reading, from the deduplicated storage system, the other data that was determined to not be in the base file; and transmitting, to the client, the other data that was determined to not be in the base file, wherein the client upon receipt assembles the file using the base file present at the client and the other data that was determined to not be in the base file.

In another embodiment, there is a computer program product, comprising a non-transitory computer-readable medium having a computer-readable program code embodied therein, the computer-readable program code adapted to be executed by one or more processors to implement a method comprising: receiving a request to restore a file at a deduplicated storage system to a client, wherein the file resides at the deduplicated storage system as a synthetic file based on a base file at the deduplicated storage system, and the request comprises an indication that the base file is also present at the client; reviewing metadata generated during a backup of the file to the deduplicated storage system, the metadata comprising references to data that was determined to be in the base file at the deduplicated storage system, and references to other data that was determined to not be in the base file at the deduplicated storage system; reading, from the deduplicated storage system, the other data that was determined to not be in the base file; and transmitting, to the client, the other data that was determined to not be in the base file, wherein the client upon receipt assembles the file using the base file present at the client and the other data that was determined to not be in the base file.

Figure 9:
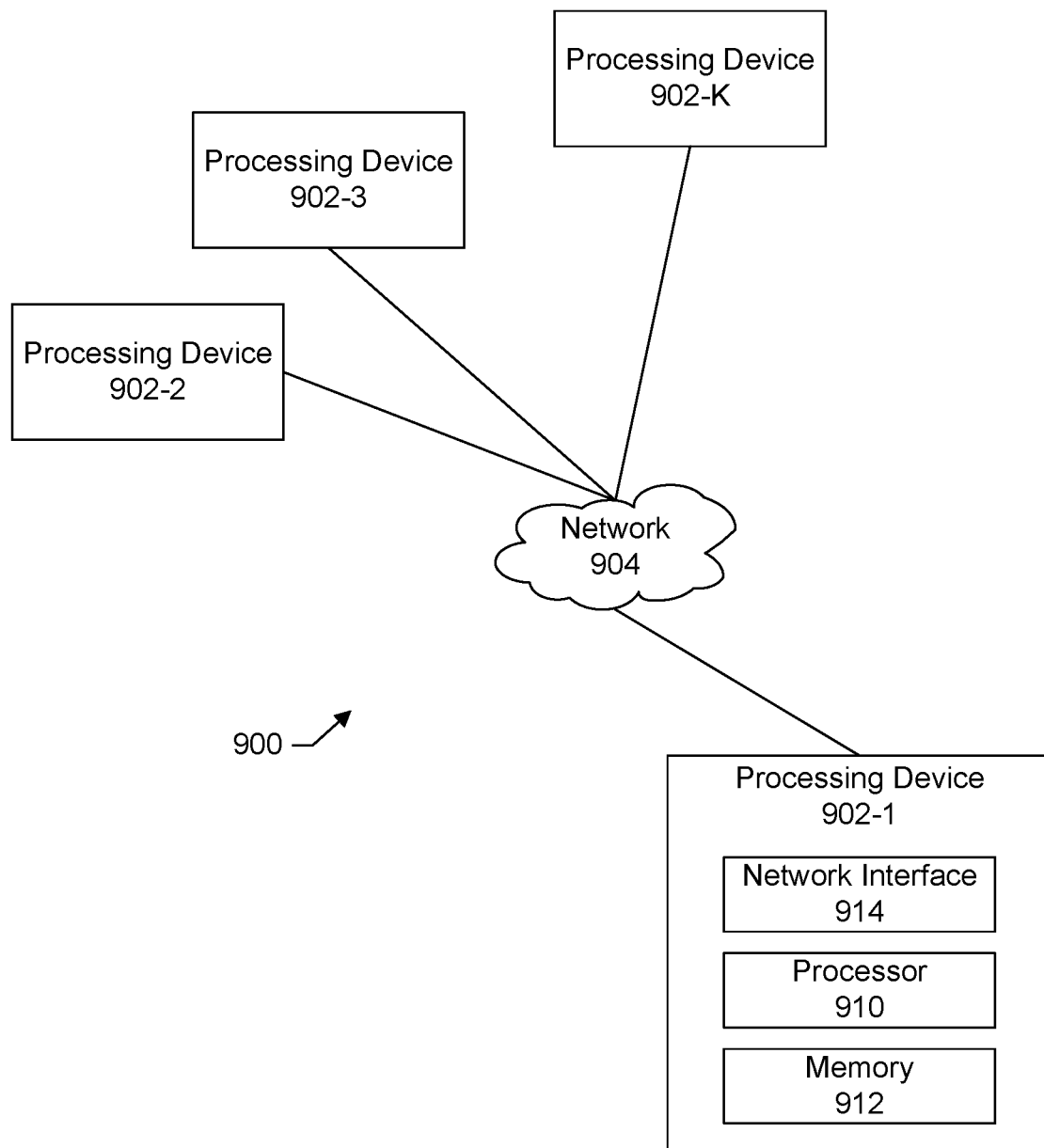
FIG. 9 shows a block diagram of a processing platform that may be utilized to implement at least a portion of an information processing system, according to one or more embodiments.

FIG. 9 shows an example of a processing platform 900 that may include at least a portion of the information handling system shown in FIG. 1. The example shown in FIG. 9 includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 10:
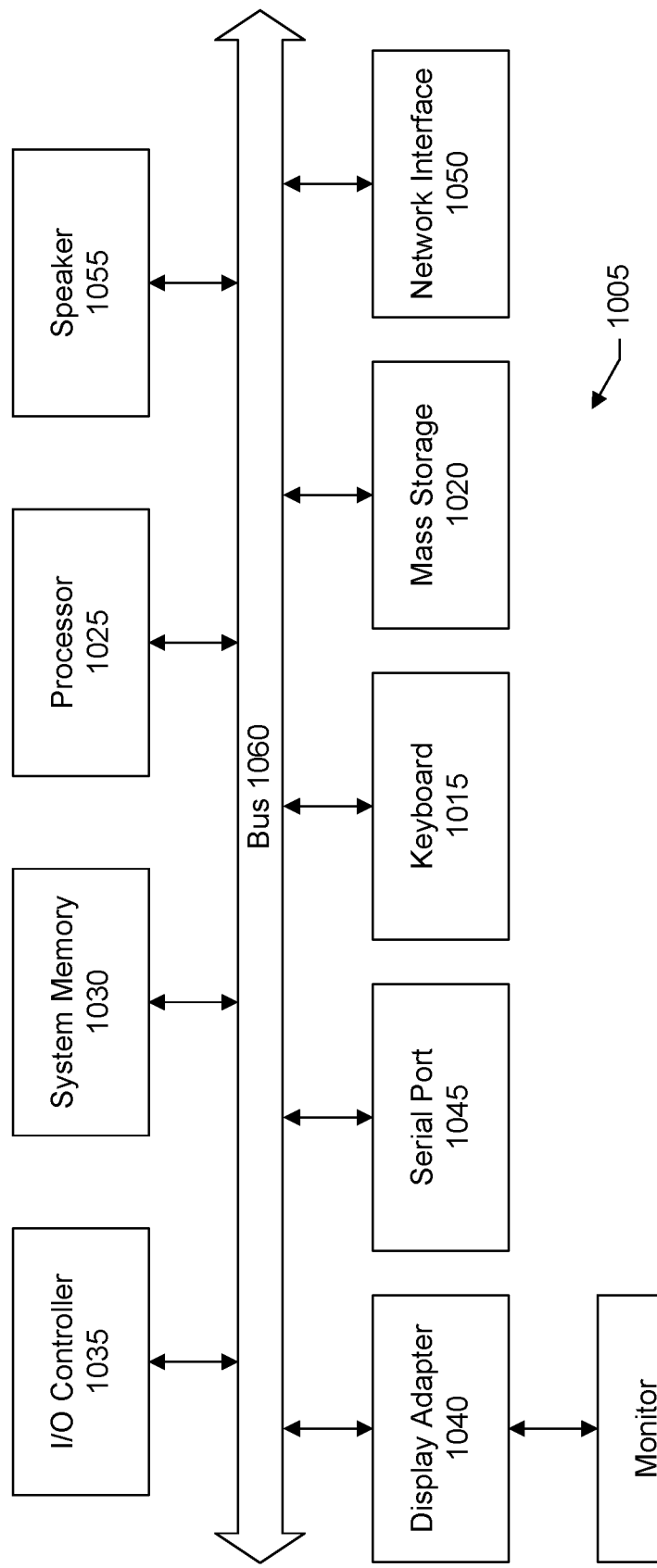
FIG. 10 shows a block diagram of a computer system suitable for use with the system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
receiving a request to restore a file at a deduplicated storage system to a client, wherein the file resides at the deduplicated storage system as a virtual synthetic file, the virtual synthetic file referencing a base file at the deduplicated storage system, and the request comprising an indication that the base file is also present at the client;
reviewing metadata generated during a backup of the file to the deduplicated storage system, the metadata comprising references to data that was determined to be in the base file at the deduplicated storage system, and references to other data that was determined to not be in the base file at the deduplicated storage system;
reading, from the deduplicated storage system, the other data that was determined to not be in the base file; and
transmitting, to the client, the other data that was determined to not be in the base file, wherein the client upon receipt assembles the file using the base file present at the client and the other data that was determined to not be in the base file.

2. The method of claim 1 further comprising:
in response to the request to restore the file, not reading from the deduplicated storage system the data that was determined to be in the base file.

3. The method of claim 1 further comprising:
during a backup of the file to the deduplicated storage system, deduplicating the file against at least the base file, the deduplicating comprising:
identifying unique and duplicate regions of the file;
writing the unique regions to the deduplicated storage system; and
synthesizing the duplicate regions by tracking offsets and lengths in the base file corresponding to the duplicate regions, and offsets in the file at which the duplicate regions start.

4. The method of claim 1 wherein the metadata is generated before the receiving the request to restore the file.

5. The method of claim 1 further comprising:
comparing a checksum of the base file present at the client with a checksum of the base file at the deduplicated storage system to verify that the base files are identical.

6. The method of claim 1 wherein the metadata comprises a file recipe for the virtual synthetic file, the file recipe comprising lineage information identifying the base file from which the virtual synthetic file was formed, and offset ranges synthesized from the base file to form the virtual synthetic file.

7. A system comprising: a processor; and memory configured to store one or more sequences of instructions which, when executed by the processor, cause the processor to carry out the steps of:
receiving a request to restore a file at a deduplicated storage system to a client, wherein the file resides at the deduplicated storage system as a virtual synthetic file, the virtual synthetic file referencing a base file at the deduplicated storage system, and the request comprising an indication that the base file is also present at the client;
reviewing metadata generated during a backup of the file to the deduplicated storage system, the metadata comprising references to data that was determined to be in the base file at the deduplicated storage system, and references to other data that was determined to not be in the base file at the deduplicated storage system;
reading, from the deduplicated storage system, the other data that was determined to not be in the base file; and
transmitting, to the client, the other data that was determined to not be in the base file, wherein the client upon receipt assembles the file using the base file present at the client and the other data that was determined to not be in the base file.

8. The system of claim 7 wherein the processor further carries out the steps of:
in response to the request to restore the file, not reading from the deduplicated storage system the data that was determined to be in the base file.

9. The system of claim 7 wherein the processor further carries out the steps of:
during a backup of the file to the deduplicated storage system, deduplicating the file against at least the base file, the deduplicating comprising:
identifying unique and duplicate regions of the file;
writing the unique regions to the deduplicated storage system; and
synthesizing the duplicate regions by tracking offsets and lengths in the base file corresponding to the duplicate regions, and offsets in the file at which the duplicate regions start.

10. The system of claim 7 wherein the metadata is generated before the receiving the request to restore the file.

11. The system of claim 7 wherein the processor further carries out the steps of:
comparing a checksum of the base file present at the client with a checksum of the base file at the deduplicated storage system to verify that the base files are identical.

12. The system of claim 7 wherein the metadata comprises a file recipe for the virtual synthetic file, the file recipe comprising lineage information identifying the base file from which the virtual synthetic file was formed, and offset ranges synthesized from the base file to form the virtual synthetic file.

13. A computer program product, comprising a non-transitory computer-readable medium having a computer-readable program code embodied therein, the computer-readable program code adapted to be executed by one or more processors to implement a method comprising:
receiving a request to restore a file at a deduplicated storage system to a client, wherein the file resides at the deduplicated storage system as a virtual synthetic file, the virtual synthetic file referencing a base file at the deduplicated storage system, and the request comprising an indication that the base file is also present at the client;
reviewing metadata generated during a backup of the file to the deduplicated storage system, the metadata comprising references to data that was determined to be in the base file at the deduplicated storage system, and references to other data that was determined to not be in the base file at the deduplicated storage system;
reading, from the deduplicated storage system, the other data that was determined to not be in the base file; and
transmitting, to the client, the other data that was determined to not be in the base file, wherein the client upon receipt assembles the file using the base file present at the client and the other data that was determined to not be in the base file.

14. The computer program product of claim 13 wherein the method further comprises:
in response to the request to restore the file, not reading from the deduplicated storage system the data that was determined to be in the base file.

15. The computer program product of claim 13 wherein the method further comprises:
during a backup of the file to the deduplicated storage system, deduplicating the file against at least the base file, the deduplicating comprising:
identifying unique and duplicate regions of the file;
writing the unique regions to the deduplicated storage system; and
synthesizing the duplicate regions by tracking offsets and lengths in the base file corresponding to the duplicate regions, and offsets in the file at which the duplicate regions start.

16. The computer program product of claim 13 wherein the metadata is generated before the receiving the request to restore the file.

17. The computer program product of claim 13 wherein the method further comprises:
comparing a checksum of the base file present at the client with a checksum of the base file at the deduplicated storage system to verify that the base files are identical.

18. The computer program product of claim 13 wherein the metadata comprises a file recipe for the virtual synthetic file, the file recipe comprising lineage information identifying the base file from which the virtual synthetic file was formed, and offset ranges synthesized from the base file to form the virtual synthetic file.

* * * * *